Figure 1:
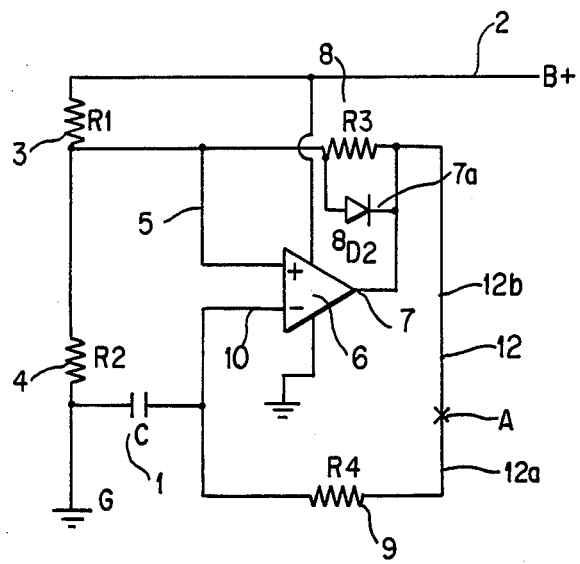

United States Patent [19]

Spiteri

[11] Patent Number: 4,876,526
[45] Date of Patent: Oct. 24, 1989

[54] HEAVY DUTY FLASHER

[76] Inventor: Joseph Spiteri, P.O. Box 243, Harborcreek, Pa. 16421

[21] Appl. No.: 187,967

[22] Filed: Apr. 29, 1988

[51] Int. Cl.$^4$ ............................................. B60Q 1/38
[52] U.S. Cl. ....................................... 340/471; 315/77
[58] Field of Search .................... 340/81 R, 81 F, 73, 340/331, 641, 642; 307/10 LS; 315/77, 200 A

[56] References Cited

U.S. PATENT DOCUMENTS

| | | | |
|---|---|---|---|
| 4,150,359 | 1/1978 | Mizuno et al. | 340/81 R |
| 4,155,069 | 5/1979 | Mason | 340/73 X |
| 4,207,553 | 6/1980 | Mizuno et al. | 340/73 |
| 4,389,597 | 6/1983 | Krumrein | 315/200 A |
| 4,504,820 | 3/1985 | Krumrein | 340/81 R |

Primary Examiner—Joseph A. Orsino
Assistant Examiner—Brian R. Tumm
Attorney, Agent, or Firm—Ralph Hammar

[57] ABSTRACT

An op-amp flasher for trucks, busses, ambulances and other equipment requiring flashing high power light sources. The flashing is made more noticeable and lamp life increased by increasing the spacing between the flashes so that the flashes are on less than half of the time. In a preferred form, the flashes are on a third of the time and intervals between flashes are two-thirds of the time.

4 Claims, 3 Drawing Sheets

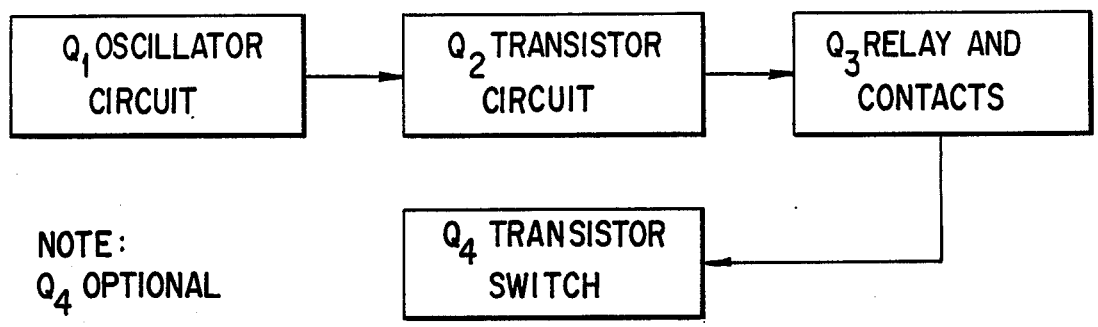
FIG. 3
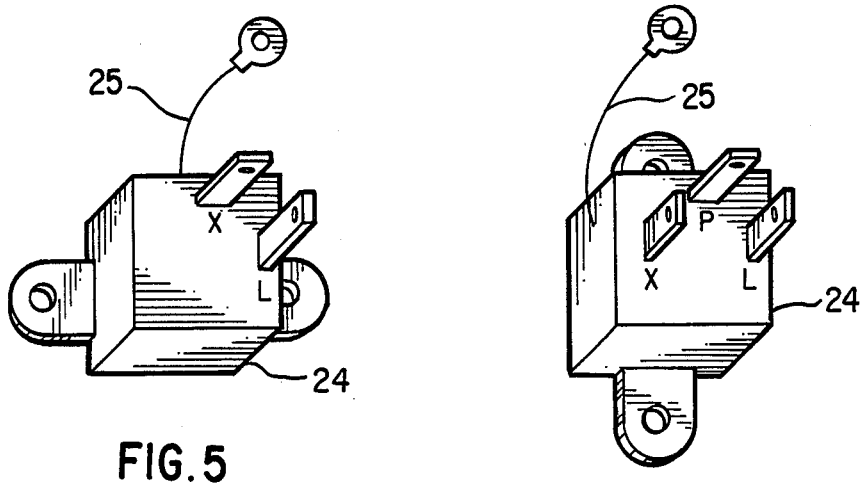
FIG. 5
FIG. 4

HEAVY DUTY FLASHER

This invention is an op-amp flasher which increases the lamp life and conspicuity of the flasher, decreases the load on the switch handle, and which has a flashing frequency substantially independent of voltage changes; and increase or decrease of one flash per volt as the battery voltage varies in the range of 12 to 14 volts.

Figure 2:
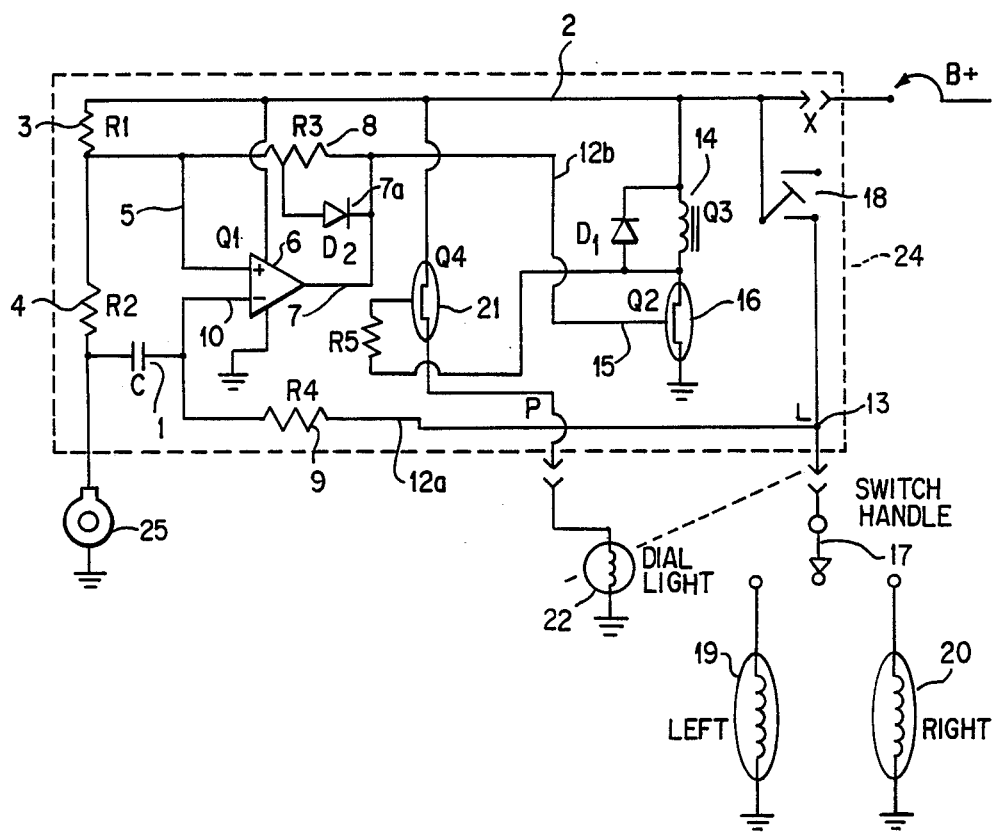
Figure 6:
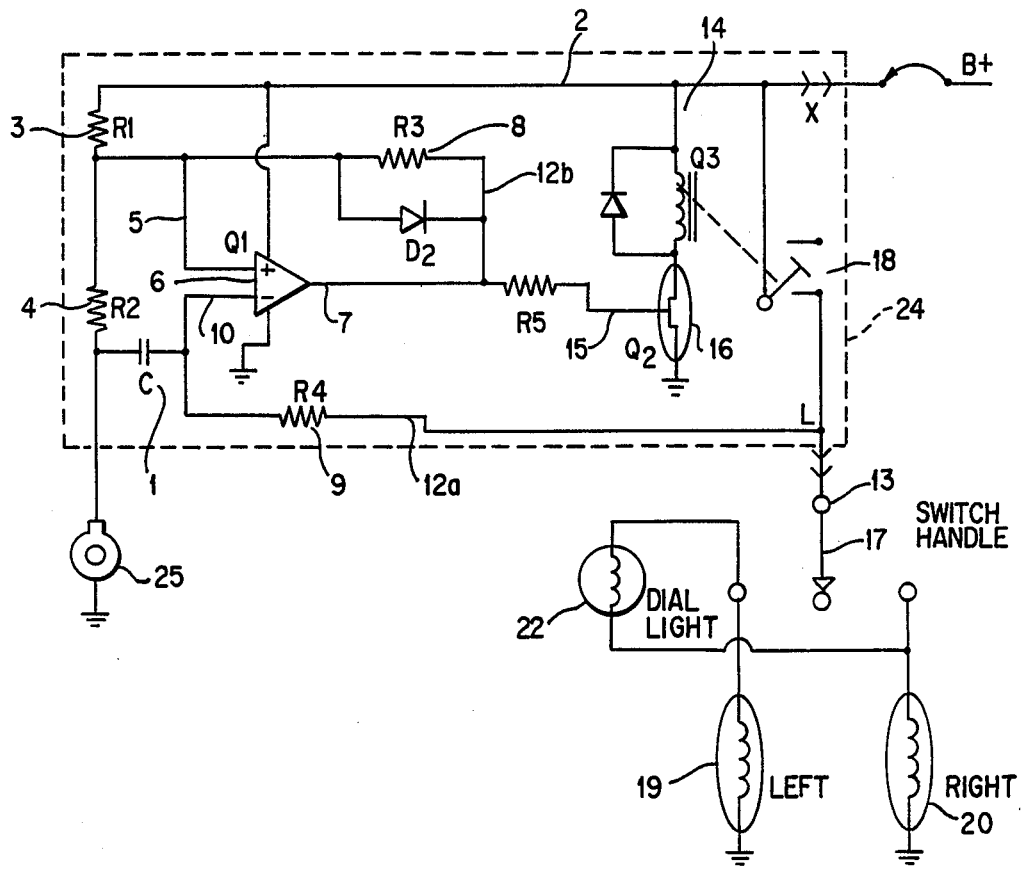

In the drawing,

FIG. 1 is a new unknown circuit diagram employing a feedback resistor R3 paralleled with a diode D2 resulting into a 33% duty cycle op-amp oscillator, FIG. 2 is a circuit for a three-prong flasher connected to a truck turn signal, FIG. 3 is a block diagram of FIG. 2, FIG. 4 is a view of a three-prong flasher, FIG. 5 is a view of a two-prong flasher and FIG. 6 is a circuit for a two-prong flasher connected to a truck turn signal.

Referring to the oscillator circuit shown in FIG. 1, and assuming that the capacitor 1 is fully discharged and that the power at input 2 has just been turned on, the voltage at the non-inverting input 5 of op-amp 6 will be one-half the voltage at voltage input 2 if the resistors of voltage divider 3, 4 are equal. Because the voltage at input 5 is greater than the voltage at inverting input 10, the output 7 of the op-amp will immediately go positive to saturation and the positive feedback through resistance 8 will latch the op-amp 6 in this condition. At the same time, capacitor 1 will start to charge from the output 7 of the op-amp 6 through resistor 9. When the voltage at the inverting input 10 of the op-amp (the voltage across capacitor 1) exceeds the voltage at the non-inverting input 5, the op-amp output 7 will immediately go negative, that is, to ground. The diode 7a holds the voltage at input 5 to 0.7 volts above ground (the voltage at output 7). The positive feedback from capacitor 1 now overrides the voltage from the voltage divider 3, 4 and latches the op-amp 6 in this condition. The capacitor 1 now starts to discharge through resistor 9, and the discharge continues until the voltage at the inverting input 10 of the op-amp is lower than the voltage at the non-inverting input 5 which is held at 0.7 volts by diode 7a. At this point, the output 7 of the op-amp goes positive and the whole process repeats until the power 2 is turned off.

The discharging time of capacitor 1 through resistor 9 controls the duration of ground or near ground voltage at output 7. The recharging time of capacitor 1 through resistor 9 controls the duration of positive voltage at output 7. The circuit was designed for ⅓ positive voltage (ON) and ⅔ ground voltage (OFF) for each cycle.

FIG. 2 shows the FIG. 1 oscillator controlling the flashing rate of a truck turn signal. Wire 12 of FIG. 1 is cut at point A and wire 12a is connected to the terminal 13 of switch handle 17 and wire 12b is connected to the base 15 of transistor 16.

In the open position of the turn signal switch handle 17 shown in FIG. 2, no current can flow through the relay contacts 18.

With no path to charge or discharge capacitor 1 the oscillator cannot operate as described above and the current drain of the circuit is limited to the negligible standby current.

Initially because of the bias voltage of about 6 volts (assuming a 12-volt battery) from resistors 3 and 4 on pin 5 of the op-amp 6, pin 7 goes positive to about 10.5 volts. Since the voltage at pin 7 is higher than the voltage at pin 5, the diode 7a is back-biased and the feedback is through resistor 8. Being of the same polarity as pin 7, this latches the op-amp 6 at the 10.5 volt output as long as the voltage on pin 5 is higher than that on pin 10. This turns on the transistor 16 and energizes the relay 14. The relay end of resistor 9 is then connected to B+ by the relay contacts 18 and the capacitor 1 charges through resistor 9 until it drives pin 10 slightly more positive than pin 5.

At this point, the output of the op-amp (pin 7) switches to ground, turning off the transistor 16 and dropping out the relay 14. Since pin 7 is now more negative than pin 5, the diode 7a is forward-biased and conducts, thus holding pin 5 about 0.7 volt above pin 7. Since pin 10 is held nearly 12 volts above ground it overrides the signal on pin 5 and holds the output of the op-amp at ground, with the transistor 16 and the relay 14 turned off. As long as the turn signal switch 17 is open, this condition persists.

When the turn signal switch handle 17 is closed on either the left or right turn signal lamp 19 or 20, the relatively low resistance of the turn signal lamp grounds the relay end of feedback resistor 9.

The capacitor starts charging through resistor 9 until the voltage on pin 10 is slightly below the voltage on pin 5. The output of the op-amp now is about 10.5 volts, turning on the transistor 16 and the relay 14 lighting lamp 19 or 20. The voltage divider consisting of resistors 3, 4 now holds pin 5 at about 6.3 volts.

As soon as the lamp filament(s) heats up, the voltage across the lamp(s) rises to nearly 12 volts, driving the relay end of resistor 9 positive. The capacitor 1 now charges through resistor 9 until pin 10 is slightly more positive than pin 5 and the output of the op-amp 6 goes to ground, shutting off the transistor 16, the relay 14 and the lamps 19 or 20. The process continues to repeat as long as the turn signal switch is closed.

The duty cycle (difference between the off-time and on-time of the lamps) is explained as follows:

When the output of the op-amp 6 is positive, turning the lamps on, the capacitor 1 has to charge up to about 6.3 volts and the voltage available for charging is about 12 volts.

When the output of the op-amp is at ground, turning the lamps off, the capacitor has to discharge from about 6.3 volts to about 0.7 volts with zero volts available—(relay 14 open). For purposes of calculation this is essentially equivalent to charging from zero volts to 5.6 volts (6.3–0.7) with only 6.3 volts available for charging.

Without going into extensive mathematics, it can be seen that the voltage available for charging the capacitor is about twice the effective voltage available for discharging, so it might be said that the capacitor charges twice as fast as it discharges, so the charging time—to shut off the lamp(s)—is roughly half of the discharging time and the lamp(s) is on one-third of the cycle and off two-thirds of the cycle. The flashing rate is about 80 flashes per minute with the lamp flashing on about one-third of the time and off about two-thirds of the time. This one-third–two-thirds on/off cycle repeats until the switch blade 18 opens the circuit to the turn signal lamp.

The value of resistor 9 affects the flash rate. If the resistor 9 is replaced with a variable resistor such as 500K Ohm Digit-Key MSG55, a variable flash rate may be obtained.

When relay contacts 18 of relay 14 are open, the discharging circuit for C is ground→19 or 20→13→9→1→ground.

When relay contacts 18 are closed, the charging circuit for C is X→18→13→9→1→ground.

The flashing rate is slightly affected by the power supply voltage varying from about 77-84 flashes per minute as the voltage varies from 12-14. The flashing rate is not affected by lamp load.

The transistor switch 21 for dial light 22 is on whenever transistor 16 is on, and is off whenever transistor 16 is off. The transistor switch 21 is used in the three-prong flasher but not in the two-prong flasher.

The flashing frequency and the duration of each flash is controlled by the charging and discharging of capacitor 1. The flash starts when the voltage at non-inverting terminal 5 exceeds the voltage on inverting terminal 10 and stops when the voltage on inverting terminal 10 exceeds the voltage on non-inverting terminal 5.

With lamps on one-third of the time and off two-thirds of the time (a 33% duty cycle) the flashes of light are discrete and the attention getting (conspicuity) is improved. Also, the load on the switch handle 17 is decreased resulting in a longer life.

The three-prong flasher of FIG. 4 is mounted in a housing 24 having a ground terminal 25, power terminal X, turn signal light terminal L and dial light terminal P. The two-prong flasher omits the dial light terminal P and the associated switching transistor, but is otherwise the same as the three-prong flasher. In the two-prong flasher, the dial light 22 is connected across the inputs for lamps 19, 20.

The components of the circuits illustrated have the following values:

| R1 & R2 | 100K |
| R3 | 33K |
| R4 | 200K |
| R5 | 1K |
| C | 1 MFD at 25 volts |
| Q1 | LM358 |
| Q4 | 214403 |
| Q2 | 2N4401 |
| Q3 | Bosch 0332206105 |
| D1 & D2 | 1N4004 |

The flashers shown in FIGS. 4 and 5 are in housings 24 containing the op-amp, transistors, diodes, resistors, capacitor and relay and having industry standard prongs XL and XLP. To install applicant's flasher, the old flasher is pulled out, applicant's flasher is plugged in and ground wire 25 is connected to ground.

Various changes may be made in the forms of the invention herein shown and described without departing from the spirit of the invention or the scope of the following claims.

I claim:

1. In combination with a turn signal having power and light terminals and a switch handle for conducting current from said light terminal to left or right turn signal lights,
   a flasher having a ground terminal connected to ground and power and light terminals connected to the corresponding turn signal terminals,
   an op-amp connected between ground and said power terminal,
   said op-amp having a non-inverting input connected to an above ground terminal of a voltage divider and an inverting input connected to ground through a capacitor and connected to said light terminal through a resistor,
   said op-amp having an output which is positive when the voltage on the non-inverting input exceeds the voltage on the inverting input and which is negative or ground when the voltage on the inverting input exceeds the voltage on the non-inverting input,
   a relay for furnishing current from the power terminal to the light terminal, and means for turning said relay "on" when the op-amp output is positive and "off" when the op-amp output is negative or ground.

2. The combination of claim 1 in which a diode lowers the voltage on the non-inverting input when the op-amp output is negative or ground.

3. The combination of claim 1 in which a forward biased diode connects the non-inverting input to the op-amp output resulting into a 33% duty cycle.

4. In combination with a turn signal having power and light terminals and a switch handle for conducting current from said light terminal to left or right turn signal lights,
   a flasher having a ground terminal connected to ground and power and light terminals connected to the corresponding turn signal terminals,
   an op-amp connected between ground and said power terminal,
   said op-amp having a non-inverting input connected to an above ground terminal of a voltage divider employing a feedback resistor paralleled with a diode resulting into a 33% duty cycle approximately doubling the life of the incandescent lamps and an inverting input connected to ground through a capacitor and connected to said light terminal through a resistor,
   said op-amp having an output which is positive when the voltage on the non-inverting input exceeds the voltage on the inverting input and which is negative or ground when the voltage on the inverting input exceeds the voltage on the non-inverting input,
   a relay for furnishing current from the power terminal to the light terminal, and means for turning said relay "on" when the op-amp output is positive and "off" when the op-amp output is negative or ground.

* * * * *